United States Patent
Raisanen et al.

(10) Patent No.: US 7,808,395 B2
(45) Date of Patent: Oct. 5, 2010

(54) OCCUPANCY DETECTING METHOD AND SYSTEM

(75) Inventors: Heikki Raisanen, Muurame (FI); Tomi Virtanen, Frankfurt am Main (DE)

(73) Assignee: Emfit Oy, Vaajakoski (FI)

( * ) Notice: Subject to any disclaimer, the term of this patent is extended or adjusted under 35 U.S.C. 154(b) by 296 days.

(21) Appl. No.: 11/937,600

(22) Filed: Nov. 9, 2007

(65) Prior Publication Data
US 2009/0121854 A1    May 14, 2009

(51) Int. Cl.
*G08B 21/00* (2006.01)
(52) U.S. Cl. .............. 340/667; 340/665; 340/511; 340/513; 340/666; 340/512; 324/207.11; 702/41; 702/43; 702/69; 702/76; 702/42; 381/86; 381/302; 381/71.4; 381/389
(58) Field of Classification Search ......... 340/665–667, 340/511–513; 324/207.11; 702/41–43, 69–76; 381/86, 302, 71.4, 389
See application file for complete search history.

(56) References Cited

U.S. PATENT DOCUMENTS

| | | | |
|---|---|---|---|
| 4,363,138 A * | 12/1982 | Franklin et al. .......... 455/226.2 |
| 5,232,243 A | 8/1993 | Blackburn et al. | |
| 5,896,090 A | 4/1999 | Okada et al. | |
| 2003/0122669 A1* | 7/2003 | Filippov et al. ............. 340/563 |
| 2006/0076164 A1* | 4/2006 | Nishio ........................ 177/136 |

FOREIGN PATENT DOCUMENTS

WO    00/64709    11/2000

\* cited by examiner

*Primary Examiner*—Davetta W Goins
*Assistant Examiner*—Ojiako Nwugo
(74) *Attorney, Agent, or Firm*—Katten Muchin Rosenman LLP

(57) ABSTRACT

A method of and a system for detecting a person occupying a vehicle seat or a corresponding underlay whereby the underlay is provided with a single dynamic sensor and whereby the measurement signal is compared with a reference signal in comparing means, wherein the system comprises first measuring means for measuring a first measurement signal in a first frequency band representing a signal for human presence, and second measuring means for measuring the reference signal as a second measurement signal in a second frequency band representing a signal for background noise, comparing means for indicating an occupancy, wherein the signal strength in the first measurement signal in the first frequency band of human presence signal domination is compared to the signal strength in the reference signal in the second frequency band where essentially only background noise exists.

12 Claims, 4 Drawing Sheets

OCCUPANCY DETECTING METHOD AND SYSTEM

FIELD OF INVENTION

The present invention relates to a method of detecting a person occupying a vehicle seat or a corresponding underlay.

Especially the present invention relates to a method of detecting a person occupying a vehicle seat or a corresponding underlay whereby the underlay is provided with a single dynamic sensor (piezoelectric etc) and whereby the sensor signal is compared with a reference signal in comparing means.

The present invention relates also to a system for detecting a person occupying a vehicle seat or a corresponding underlay.

BACKGROUND OF INVENTION

There are several ways to detect of a person a person sitting in a car seat with a sensor system arranged in a car seat. The sensor may be a passive sensor system (capacitors etc) or a dynamic sensor system (piezoelectric sensors etc).

WO0064709 relates to a single capacitive sensor element which is excited by a broadband drive signal and generates a measurement signal which is then subjected to an autocorrelation with the drive signal. The drive signal is preferably a binary pseudo-random noise signal, so that a good signal/noise ratio can be obtained. With a binary drive signal and measurement signal the autocorrelatlon can be carried out, in the simplest of cases, with a simple AND element.

U.S. Pat. No. 5,232,243, discloses an occupant sensing apparatus includes a piezoelectric film sensor and a controller. The piezoelectric film sensor is disposed in a seat and is oscillated by a driving circuit. The controller is connected to the piezoelectric film sensor and monitors an oscillation value of the piezoelectric film sensor. When a person is seated on the seat, the piezoelectric film sensor contacts a contacting arm of the seat. Therefore, the oscillation value of the piezoelectric film sensor is attenuated. As a result, the controller determines a seated condition of the seat in accordance with the oscillation value of the piezoelectric film sensor.

U.S. Pat. No. 5,896,090 discloses an occupant sensing apparatus for detecting a seated person on a seat includes a pressure switch disposed in the seat. The pressure switch has a pair of films and a pair of electrodes disposed between the films. The pair of electrodes are spaced in the films so as to define an OFF condition of the pressure switch. The pressure switch is in an ON condition when the electrodes contact each other. The occupant sensing apparatus further includes a controller connected to the electrodes of the pressure switch and determining whether the seat is occupied in accordance with the ON or OFF condition of the pressure switch. The pressure switch includes a pair of films and a plurality of electrode pairs. The films are made of resin material. Both films are formed in a lattice shape and are thin so as to be flexible. The film is laminated onto the film and the films are connected with a plurality of bond members. The electrodes are disposed between the films and spaced apart from each other. The plurality of electrodes are printed onto an inner surface of the film which is bonded to an inner surface of the film. The plurality of electrodes are printed onto the inner surface of the film which is bonded to the inner surface of the film so as to be able to contact the opposing plurality of electrodes. The plurality of bond members are disposed between electrodes and adjacent electrodes. The bond members are bonded to the inner surface of the film and the inner surface of the film in order to define a distance A between the plurality of electrodes and the plurality of electrodes. When the distance is maintained, the pressure switch is in an OFF condition. When at least one of the electrodes contacts the opposing electrode, the pressure switch is in an ON condition.

Initial tests for in-car presence (occupancy) detection with a single sensor and simple (unfiltered) signal strength threshold comparator method based on prior art systems and methods have often failed, as expected. This is mainly due to the fact that the in-car environment has background vibrations (hereafter referred also as noise) in so great magnitude variations that a more sophisticated algorithm must be designed for reliable presence (occupancy) detection.

BRIEF DESCRIPTION OF THE INVENTION

The object of the present invention is to overcome the problems with the existing methods of detecting a person occupying a vehicle seat or a corresponding underlay.

It has been found out that the overall signal strength varies greatly according to environment conditions (engine vibrations, driving vibrations, etc.), over a wide range of frequencies. This variation seems to be somewhat consistent over frequency band of 1 ... 80 Hz. The human presence signal is concentrated on frequencies between approximately 1 ... 20 Hz and is well visually distinguishable in all the examples above. See FIGS. 1 to 3 presenting spectral content analyses of signals recorded in real-life environment. Dashed lines are no occupancy and whole and dotted lines are with occupancy.

To get an indication of an occupancy, the signal strength in the frequency band of human presence signal domination could be ratiometrically compared to some other frequency band signal strength where only background noise exists by means of spectral content analysis.

This can with properly set frequency ranges, 'cancel out' most of the background noise and make the detection also immune to absolute signal strength variations without the need to use a second sensor for noise cancellation and/or setting thresholds levels.

The present invention is in detail defined in the enclosed claims, especially in the independent method and system claims.

The present invention minimizes the background, such as in-car environmental, vibrations in an occupation detection system.

According to the present invention the relative power level clearly indicates human presence and that it is very immune to background noise. It seems possible to select a fixed set level for the comparator and achieve reliable presence/absence detection in various conditions. The invented algorithm is also very insensitive to absolute signal strength and slight overdrive of the preamplifier electronics (signal B3b), making unit-to-unit and anti-aging calibration in most cases unnecessary.

BRIEF DESCRIPTION OF THE FIGURES

In the following, preferred embodiments of the present invention will be described in detail by reference to the enclosed drawings, wherein

FIG. 1 is an engine-off situation,

FIG. 2 a road driving situation and

FIG. 3 an engine-on situation.

DETAILED DESCRIPTION OF THE PREFERRED EMBODIMENTS

Figure 1:
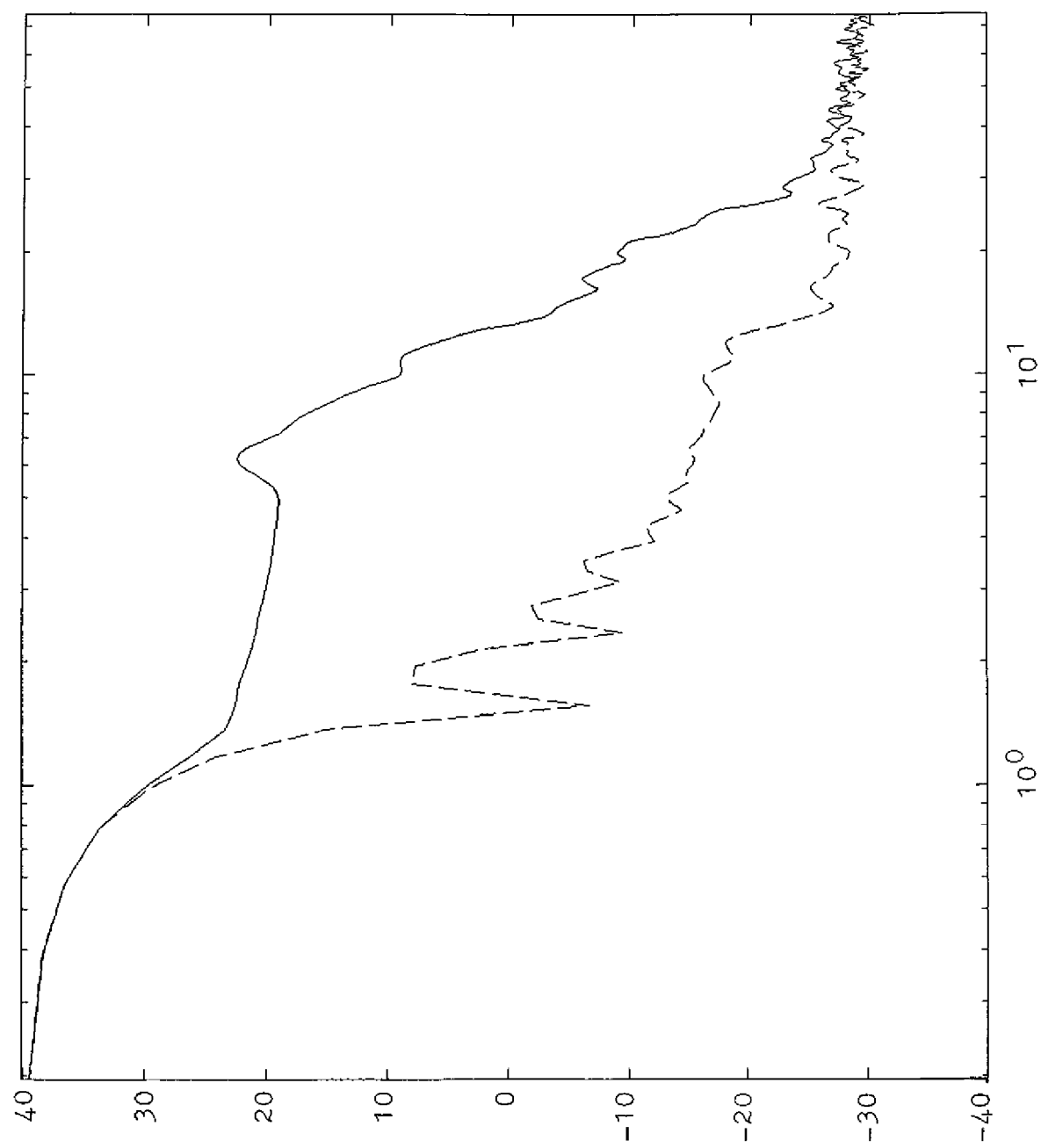
FIGS. 1 to 3 present spectral content analyses of signals recorded in real-life environment. Dashed lines are no occupancy and whole and dotted lines are with occupancy.
Figure 2:
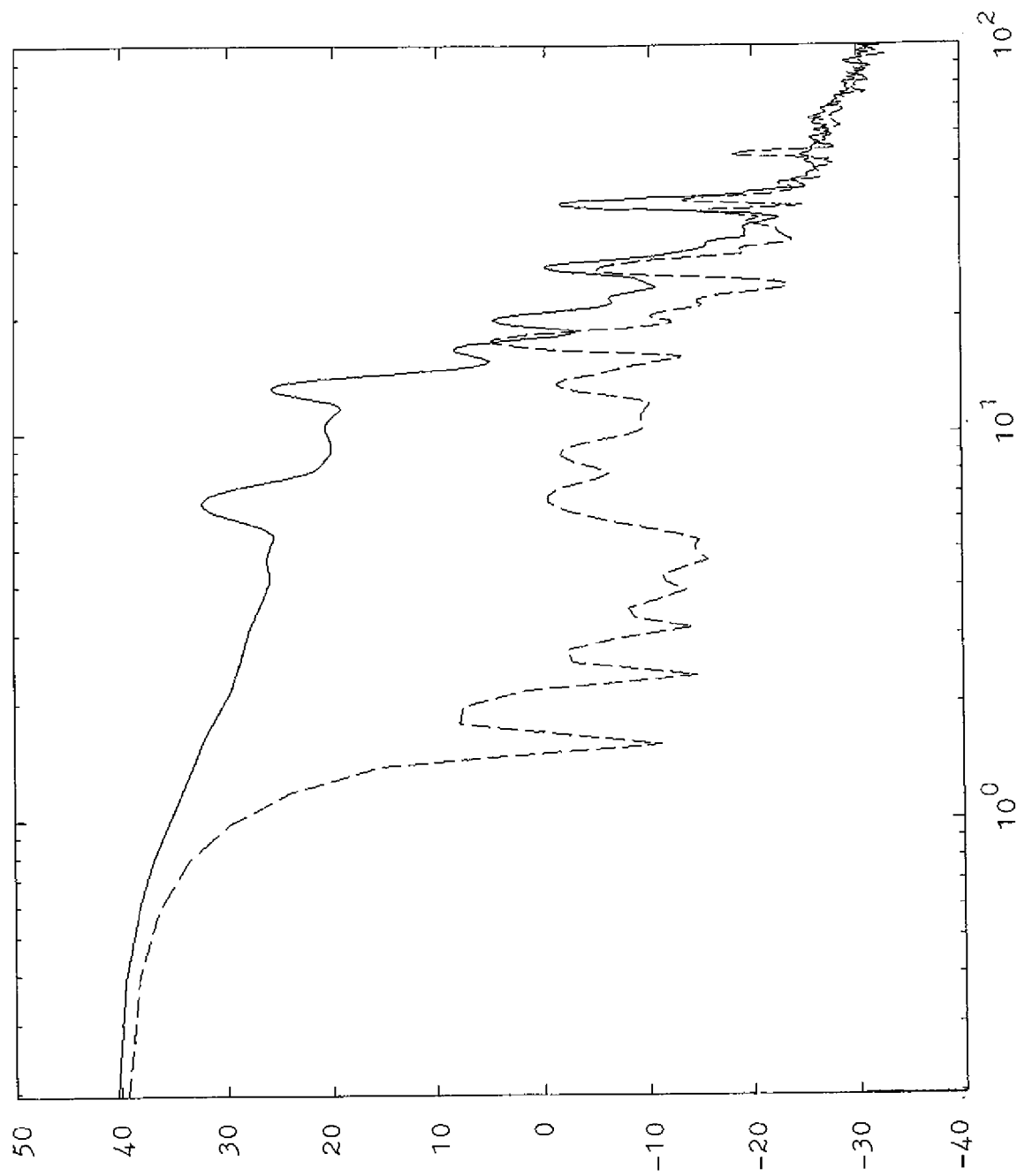
Figure 3:
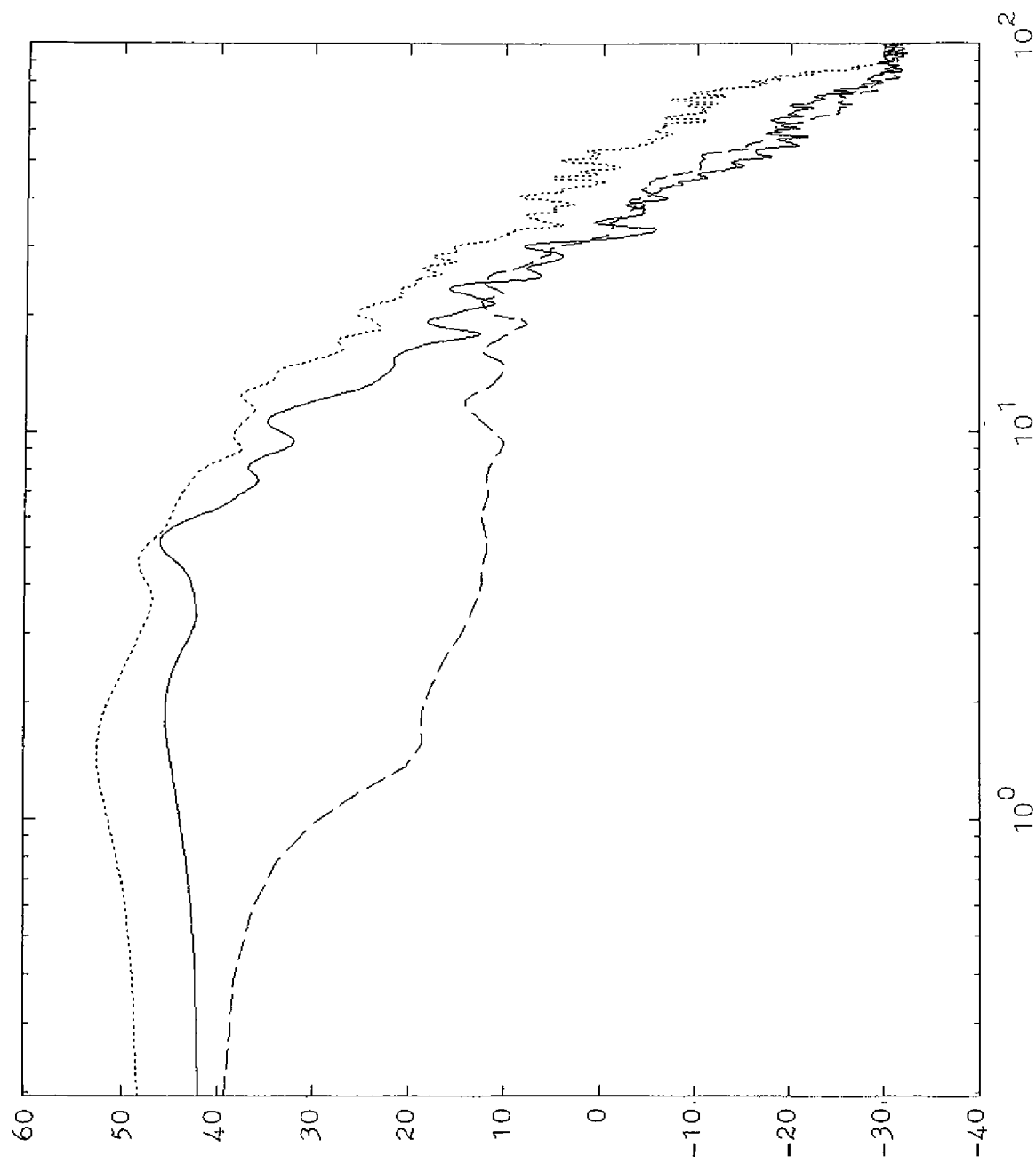
Figure 4:
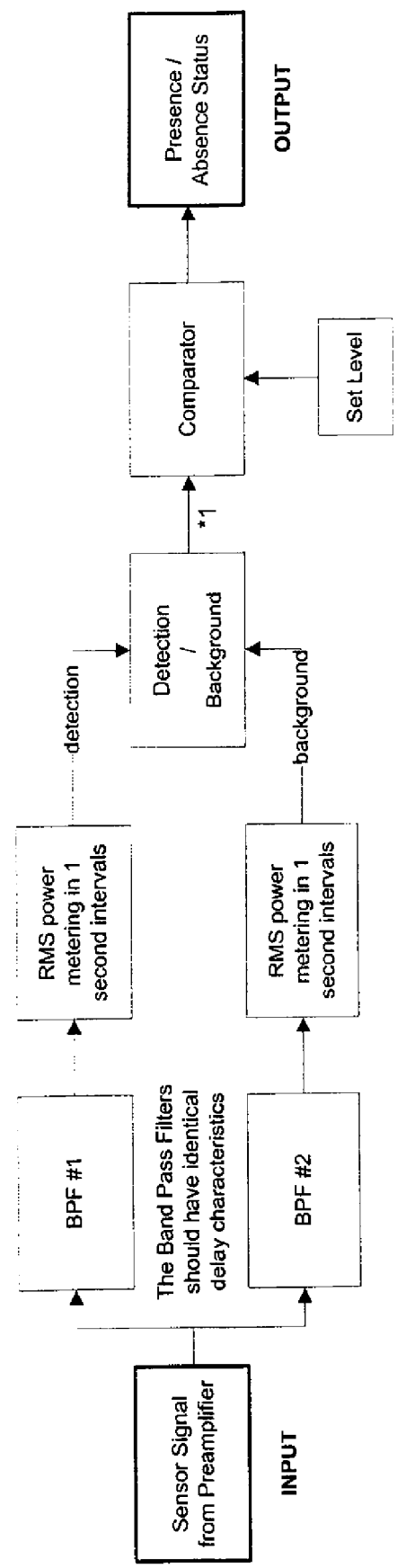
FIG. 4 presents a block diagram of an algorithm a preferred embodiment of the present invention.

FIG. 4 presents a block diagram of an algorithm a preferred embodiment of the present invention. In FIG. 4 the sensor signal from the sensor is first amplified and this amplified signal is the input 11 to the analysis.

The signal is then steered to two parallel band pass filters 12 and 13 having identical delay characteristics where the signals are filtered. After filtering the RMS power of the signals are metered in RMS power metering 14, 15 in preferably 1 second intervals. After that the detection signal and the background signal are steered to a detection/background unit 15 and further to a comparator 16 having a predefined set level, where the detection and background signals are compared.

The system finally outputs at OUTPUT 17 the detection signal informing of the presence/absence status of the seat.

Band-Pass Filter #1's 12 pass-band should be in frequency range where human presence signal is at strongest. 2 . . . 18 Hz should be a good starting point.

Band-Pass Filter #2's 13 pass-band should be in frequency range where the background noise dominates. 30 . . . 80 Hz should be a good starting point.

The band-pass filters should have identical delay characteristics.

The signal is divided into two paths with the 2 band-pass filters and then each path is metered for RMS power individually.

The power levels are updated twice a second with the output being the measured RMS power of the signal from T−1s to T. This relative power value indicates a person's presence and be insensitive to environmental variations.

A simple comparator on the value of relative power could be used for presence/absence detection final stage.

It is obvious to the person skilled in the art that the embodiments of the invention are not restricted to the example presented above, but that they can be varied within the scope of the following claims. The underlay may also be a bed or floor e.g. in a hospital.

The invention claimed is:

1. A method of detecting occupancy of a vehicle, the method comprising:
   (a) filtering an initial signal in a first and a second band pass filter to result in a respective first and second frequency band;
   (b) measuring in a first measuring means a first measurement signal in the first frequency band representing a first signal indicative of a human occupancy;
   (c) measuring in a second measuring means a reference signal as a second measurement signal in the second frequency band representing a second signal indicative of background noise;
   (d) comparing a first signal strength of the first measurement signal to a second signal strength of the second measurement signal in a comparing means; and
   (e) detecting occupancy so that when the first signal strength is different from the second signal strength the occupancy has been detected; and
   wherein the first and measuring means are directly connected to the respective first and second band pass filter.

2. The method of claim 1, wherein step (d) is performed by ratiometrically comparing the first and second signal strength.

3. The method of claim 1, wherein step (d) is performed comparing in a spectral analysis means the first and second signal strength for comparing the first frequency band to the second frequency band using spectral content analysis.

4. The method of claim 1, wherein the first frequency band comprises the signal indicative of human occupancy in the range of 2 to 18 Hz and wherein the second frequency band comprises the signal indicative of background noise in the range of 30 to 80 Hz.

5. An occupancy detection system for a vehicle, the system comprising:
   an underlay comprising a single dynamic sensor for detecting an initial signal;
   a first and a second band pass filter, each band pass filter arranged to filter a respective first and second frequency band from the initial signal;
   a first measuring means for measuring a first measurement signal of the first frequency band representing a signal indicative of a human occupancy;
   a second measuring means for measuring a reference signal as a second measurement signal of the second frequency band representing a signal indicative of background noise;
   a comparing means for comparing a first signal strength of the first measurement signal to a second signal strength of the second measurement signal;
   wherein when the first signal strength is different from the second signal strength the occupancy has been detected; and
   wherein the first and measuring means are directly connected to the respective first and second band pass filter.

6. The system of claim 5, further comprising an amplifying means for amplifying the first and the second measurement signal.

7. The system of claim 5, further comprising a spectral analysis means for comparing the first frequency band to the second frequency band using spectral content analysis.

8. The system of claim 5, further comprising an spectral analysis means for comparing the first frequency band to the second frequency band using spectral content analysis.

9. The system of claim 7, wherein the first frequency band comprises the signal indicative of human occupancy in the range of 2 to 18 Hz.

10. The system of claim 7, wherein the second frequency band comprises the signal indicative of background noise in the range of 30 to 80 Hz.

11. The system of claim 5, further comprising a first and a second band pass power meter, each power meter arranged to the respective frequency band for metering a respective first and second RMS power, the first and second RMS power comprising the respective first and second measurement signal.

12. An occupancy detection system for a vehicle, the system comprising:
   an underlay comprising a single dynamic sensor for detecting an initial signal;
   a first and a second band pass filter, each band pass filter arranged to filter a respective first and second frequency band from the initial signal;
   a first measuring means for measuring a first measurement signal in the first frequency band representing a signal indicative of a human occupancy;

a second measuring means for measuring a reference signal as a second measurement signal in the second frequency band representing a signal indicative of background noise;

a first and a second band pass power meter, each power meter arranged to the respective frequency band for metering a respective first and second RMS power;

wherein when the first RMS power is different than the second RMS power the occupancy has been detected; and wherein the first and measuring means are directly connected to the respective first and second band pass filter.

* * * * *